(12) United States Patent
Cabrespine et al.

(10) Patent No.: US 10,649,641 B2
(45) Date of Patent: *May 12, 2020

(54) AGRICULTURAL MACHINE

(71) Applicant: CLAAS Tractor SAS, Vélizy-Villacoublay (FR)

(72) Inventors: Arnaud Cabrespine, Fontenay Le Fleury (FR); Pierre Noyer, München (DE); Christian Ehlert, Bielefeld (DE); Jan Carsten Wieckhorst, Paderborn (DE); Christopher Armbrust, Osnabrück (DE); Kalle Weiland, Bielefeld (DE); Bernd Schoch, Gütersloh (DE); Josef Maier, Altfraunhofen (DE)

(73) Assignee: CLAAS Tractor SAS, Vélizy-Villacoublay (FR)

( * ) Notice: Subject to any disclaimer, the term of this patent is extended or adjusted under 35 U.S.C. 154(b) by 2 days.

This patent is subject to a terminal disclaimer.

(21) Appl. No.: 15/975,109

(22) Filed: May 9, 2018

(65) Prior Publication Data

US 2018/0329620 A1 Nov. 15, 2018

(30) Foreign Application Priority Data

May 10, 2017 (DE) .................. 10 2017 110 106

(51) Int. Cl.
*G06F 3/0484* (2013.01)
*A01B 69/00* (2006.01)
(Continued)

(52) U.S. Cl.
CPC ........ *G06F 3/04847* (2013.01); *A01B 69/007* (2013.01); *B62D 49/0614* (2013.01);
(Continued)

(58) Field of Classification Search
CPC ............. G06F 3/04847; G06F 3/04886; G06F 3/0482; G06F 2203/04803;
(Continued)

(56) References Cited

U.S. PATENT DOCUMENTS 8,583,326 B2 11/2013 Collins
2014/0053094 A1* 2/2014 Grevinga ............ G06F 3/04883
715/771

(Continued)

FOREIGN PATENT DOCUMENTS

CN 106572630 A 4/2017
DE 102013112294 A1 5/2015
(Continued)

OTHER PUBLICATIONS

European Search Report for EP Application No. 18171017.9-1006, dated Oct. 8, 2018.

*Primary Examiner* — Yuen Wong
(74) *Attorney, Agent, or Firm* — Lempia Summerfield Katz LLC (57) ABSTRACT

An agricultural machine, such as a tractor, is disclosed. The agricultural machine includes a driver assistance system, which comprises an input/output unit for specifying an agricultural working task by an operator and for performing the settings relating to an agricultural working task by the operator. The input/output unit displays virtual operating elements, making the settings possible, and the information corresponding to the settings to be made. Further, the input/output unit includes a set-up assistant unit, which allows the operator to set up the driver assistance system using the virtual operating elements. Further, the set-up assistant unit may be configured depending on the working task determined by the operator.

20 Claims, 4 Drawing Sheets

(51) Int. Cl.
*G05D 1/02* (2020.01)
*B62D 49/06* (2006.01)
*G06F 3/0482* (2013.01)
*G06F 3/0488* (2013.01)

(52) U.S. Cl.
CPC ......... *G05D 1/0219* (2013.01); *G05D 1/0278* (2013.01); *G06F 3/0482* (2013.01); *G06F 3/04886* (2013.01); *G05D 2201/0201* (2013.01); *G06F 2203/04803* (2013.01)

(58) Field of Classification Search
CPC ............. B62D 49/0614; G05D 1/0278; G05D 1/0219; G05D 2201/0201; A01B 69/007
See application file for complete search history.

(56) References Cited

U.S. PATENT DOCUMENTS

| | | | |
|---|---|---|---|
| 2014/0156152 A1* | 6/2014 | Faivre | E02F 9/2253 701/50 |
| 2016/0224021 A1 | 8/2016 | Kuikka | |
| 2017/0090479 A1 | 3/2017 | Wilcox et al. | |
| 2017/0248946 A1 | 8/2017 | Ogura et al. | |

FOREIGN PATENT DOCUMENTS

| | | |
|---|---|---|
| DE | 102014102489 A1 | 8/2015 |
| DE | 102016216740 A1 | 3/2017 |
| WO | WO2014177755 A1 | 11/2014 |

* cited by examiner

AGRICULTURAL MACHINE

CROSS REFERENCE TO RELATED APPLICATION

This application claims priority under 35 U.S.C. § 119 to German Patent Application No. DE 102017110106.3, filed May 10, 2017, the entire disclosure of which is hereby incorporated herein by reference.

TECHNICAL FIELD

The technical field relates to an agricultural machine. More specifically, the technical field relates to an agricultural machine, such as a tractor, that allows an operator of the agricultural machine to set up the driver assistance system of the agricultural machine using virtual operating elements.

BACKGROUND

U.S. Pat. No. 8,583,326 B2 discloses an agricultural machine that includes global navigation satellite system (GNSS) based positioning, guidance and automatic steering, and that allows a user to lock onto and guide a vehicle in real time along one particular guidance path of choice, which may deviate from an initial or pre-planned guidance route, while ignoring other possible guidance paths.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

A satellite-based steering system may be part of a driver assistance system of an agricultural machine, thereby allowing continuous adaptation of the travel route. To configure such a satellite-based steering system, menu-guided set-up assistants may be used in which the operator has to enter a large amount of detailed data. For example, the operator must enter an offset of the satellite receiver on the working machine or a turning radius of the working machine. In this regard, the operator must determine or know this detailed data precisely beforehand.

Further, even with the operator entering the detailed data via the menu-guided set up, the operator still needs to be thoroughly familiar with the relevant documentation of the agricultural machine; otherwise, reliable functioning of the steering system of the agricultural machine is not guaranteed. Further, additional work on the operator's part is necessary when setting up or programming a headland sequence management system.

In one implementation, an agricultural machine is provided that includes a set-up assistant unit with which a driver assistance system can be operated more easily. More specifically, the agricultural machine, such as a tractor, includes a driver assistance system that comprises an input/output unit for specifying an agricultural working task by an operator (e.g., the operator inputting the agricultural working task using the input/output unit) and for carrying out the settings relating to the agricultural working task by the operator. The input/output unit may display virtual operating elements making the settings possible and the information corresponding to the settings to be made, with the input/output unit including a set-up assistant unit, which allows the operator to set up the driver assistance system via the virtual operating elements and in which the set-up assistant unit can be configured depending on the agricultural working task determined or dictated by the operator.

As discussed above, one example agricultural machine is a tractor. Alternatively, the disclosed solution may be used on any other type of agricultural machine, such as, for example, a combine harvester or a forage harvester. In this regard, any discussion below regarding a tractor may likewise be applied to any other type of agricultural machine, such as applied to a combine harvester or a forage harvester.

In one implementation, the agricultural machine comprises a driver assistance system, which may support the driver or the operator of the agricultural machine during one or more parts of operation of the agricultural machine, such as in order to configure the agricultural machine to perform an upcoming agricultural working task or in order to configure the agricultural machine while performing the agricultural working task. The driver assistance system may provide support in any one or any combination of several ways, including support relating to the driving and/or steering of the agricultural machine, and including support relating to the implementation of determined sequences of operating steps or commands (sequence management), such as for a headland. Such a headland sequence (including a headland turn sequence) may also comprise, in particular, driving and/or steering commands.

The set-up assistant unit of the agricultural machine may be configurable as a function of an agricultural working task. Various types of configuration of the set-up assistant unit are contemplated including a set-up assistant unit based on a dialogue-based manner and/or a set-up assistant unit based on speech-based manner. In the driver assistance system, the operator may thus initially predetermine or indicate a specific agricultural working task via the input/output unit. In one implementation, the input/output unit may output several agricultural working tasks as specified by the system, with the operator selecting his/her agricultural working task from the several agricultural working tasks specified by the system that are output. In an alternate implementation, the operator may input the agricultural working task without being provided a list from which to choose. In response to the operator selecting the specific agricultural working task, the set-up assistant unit may automatically activate or enter a working task-specific configuration. For example, the set-up assistant unit may generate sequential steps or input screens to proceed through the working task-specific configuration. Through this, in one implementation, the set-up assistant unit is configured in such a way that the operator only has to carry out necessary settings and/or can directly (e.g., without further inputs) accept the settings proposed by the system (e.g., confirm the settings that are proposed by the system). Thus, responsive to the operator indication of input of the agricultural working task, the set-up assistant unit is configured to execute a working task-specific configuration. For example, responsive to an indication by the operator of a specific agricultural working task, the set-up assistant unit is configured to select the one or more input screens associated with the specific agricultural working task. Optionally in addition, the selected one or more input screens may be prepopulated with set-up information such that, upon output of the one or more input screens, the operator may simply confirm the use of the prepopulated set-up information. Further, the set-up information may be obtained in one of several ways, as discussed further below (e.g., by accessing a database (internal or external) that correlates the specific agricultural working task with the set-up information). As discussed further below, the working task-specific configuration is tailored to the operator-indicated agricultural working task and reduces the necessary input by the operator (e.g., limiting the input required by the operator to define the working task-specific configuration, such as simply confirming settings proposed by the system).

Using the special driver assistance system and the special input/output unit, the disclosed agricultural machine simplifies, for the operator, the configuration or the setting up of the driver assistance system, such as by using the working task-specific configuration of the set-up assistant unit and/or such as by menu guidance (e.g., natural speech and/or dialogue-based menu guidance). In this way, the disclosed agricultural machine significantly simplifies the configuration or the setting up of the driver assistance system, in contrast to previous agricultural machines.

The agricultural machine may include various types of steering systems. For example, the steering system may comprise a satellite-based steering system, which may be configured or adjusted as disclosed herein. In addition, the sequence management system of the driver assistance system may be set up or configured with the set-up assistant unit. In one implementation, the sequence management system comprises a system for a headland (e.g., a headland sequence management system) in which the sequence of operating steps/commands includes, in particular, various driving commands (e.g., braking and accelerating), steering commands, and control commands. The control commands may comprise commands for internal control of the agricultural machine and/or commands for a device connected to the agricultural machine (e.g., a device firmly connected to the agricultural machine, such as agricultural machine working units and/or external units or working units connectable to the agricultural machine for carrying out or supporting an agricultural working task). Corresponding headland sequence management allows for an automatic change in the direction of travel of the agricultural machine in order to relieve the operator of performing this operation. In practice, other subordinate systems of the agricultural machine and the driver assistance system may be set up or configured with the working task-specifically configurable set-up assistant unit. Example subordinate systems that may be configured with the working task-specifically configurable set-up assistant unit include, but are not limited to any one, any combination, or all of: a section control system (system for automatic part width switching); a system for controlling and/or regulating an electronic drawbar; a system for autonomous working; and/or a distance monitoring system.

In one implementation, the set-up assistant unit allows the selection, by the operator, of a working task from a group of working tasks. Specifically, based on the selected working task (as indicated by the operator), the set-up assistant unit carries out a basic configuration of any one, any combination, or all of: the driver assistance system; the steering system; the sequence management system; the section control system; the system for the control and regulation of an electronic shaft; the system for autonomous operation; and/or distance monitoring system, etc.

Various agricultural working tasks, which can form the basis of the configuration of the set-up assistant unit for the driver assistance system, are contemplated. As one example, agricultural working tasks may be subordinate to the work type "cultivation". In particular, the working task may comprise any one, any combination, or all of: "ground/soil working"; "sowing"; "planting"; "plant protection"; "fertilizing"; "manured and dung"; "harvesting"; and "stubble breakage". In practice, the agricultural working task may be shown by and selected by the operator using the input/output unit, with the selection being used for configuration of any one, any combination or all of: the driver assistance system; the steering system; the sequence management system; the section control system; the system for the control and/or regulation of the electronic drawbar; the system for autonomous operation; and/or the distance monitoring system.

As another example, the working tasks may be subordinate to the work type "fodder harvesting". In particular, the working task may comprise any one, any combination, or all of: "grassland management"; "harvesting"; "grassland care"; or "silage". In practice, the working task may be shown by and selected from the input/output unit, with the selection by the operator being used by the set-up assistant unit for configuration of any one, any combination or all of: the driver assistance system; the steering system; the sequence management system; the section control system; the system for the control and/or regulation of the electronic drawbar; the system for autonomous operation; and/or the distance monitoring system.

As still another example, the working tasks may be subordinate to the work type "other work". In particular, the working task may comprise any one, any combination, or all of: "construction site"; "material handling"; "forestry work"; "transport"; or "communal work". In practice, the working task may be shown by and selected from the input/output unit, with the selection by the operator being used by the set-up assistant unit for configuration of any one, any combination or all of: the driver assistance system; the steering system; the sequence management system; the section control system; the system for the control and/or regulation of the electronic drawbar; the system for autonomous operation; and/or the distance monitoring system.

In one implementation, based on the basic configuration, the set-up assistant unit is configured to generate at least one input entry screen, which is shown or output by the input/output unit. The input screen then allows an operator to input a selection of at least one setting for the computer-supported planning of a travel route and/or a sequence of operating steps from a group of settings. Alternatively, or additionally, the input screen allows the operator to confirm at least one working task-specific setting subordinate to the basic configuration and specified by the set-up assistant unit for the computer-supported planning of a travel route and/or a sequence of operating steps. The same may apply for the selection and/or operator confirmation of at least one setting for computer-supported adaptation of various other systems within the agricultural machine, including any one, any combination or all of: the section control system; the system for controlling and/or regulating an electronic drawbar; the system for autonomous working; the distance monitoring system; etc.

The working task-specific setting subordinate to the basic configuration may be a setting which is selected from the group comprising any one, any combination, or all of: a correction signal setting; the selection and/or configuration of a working unit for carrying out or supporting the agricultural working task; the selection and/or configuration of a speed sensor; the selection and/or configuration of a GPS or georeference system; the selection and/or configuration of a travel route; and/or the selection and/or configuration of a headland sequence. Alternatively, or additionally, such working task-specific setting may also be shown by the input/output unit. In one implementation, the set-up assistant unit may display several selection options for the working task-specific setting subordinate to the basic configuration. Responsive to the display, the operator may select one of the options.

In one implementation, at least one working unit is displayed to the user or operator as a settable or selectable working unit, with the settable or selectable working unit being assigned to an agricultural working task, such as those discussed previously. For example, the working unit may be intended for the working task, which may be shown or displayed as any one, any combination or all of: "ground/soil working"; "sowing"; "planting"; "plant protection"; "fertilizing"; "manured and dung"; "harvesting"; and "stubble breakage". As another example, the working unit may be intended for the working task, which may be shown or displayed as any one, any combination or all of: "grassland management"; "harvesting"; "grassland care"; and "silage". As still another example, the working unit may be intended for the working task, which may be shown or displayed as any one, any combination or all of: "material handling"; "forestry work"; "transport"; and "communal work". For the working task "ground/soil working", a plough and/or a cultivator may be shown as the assigned working unit. For the superordinate agricultural working task "fodder harvesting" and/or "harvesting", a hay tedder and/or a baling press may be shown as the allocated working unit for example. These are only intended as some examples of a working unit assigned to an agricultural working task. Other working units assigned to respective agricultural working tasks are contemplated.

In one implementation, the set-up assistant unit allows the operator to also load a travel route and/or sequence of operating steps/commands from an external data source and/or to record and/or to edit it. The external data source may comprise an external electronic device. Example external electronic devices may comprise a portable memory device (e.g., a USB stick), a communication from a computer centre (e.g., an external database), or the like. Recording and/or editing may take place on the external data source or on an internal data storage device. In a specific implementation, the sequence of operating steps or commands may comprise a headland sequence.

In one implementation, the input/output unit comprises a touchscreen. In this way, the set-up assistant unit displays the selection of the working task and/or the working task-specific setting in a symbol-based and/or image based and/or text-based manner.

Thus, the disclosed agricultural machine 1 enables automatic working task-specific configuration of a set-up assistant unit 2 of a driver assistance system 3. An operator may thus predetermine an agricultural working task for the driver assistance system 3 through which the set-up assistant unit 2 is adapted accordingly. In this way, the operator need only make certain necessary adjustments (e.g., absolutely necessary adjustments).

Figure 1:
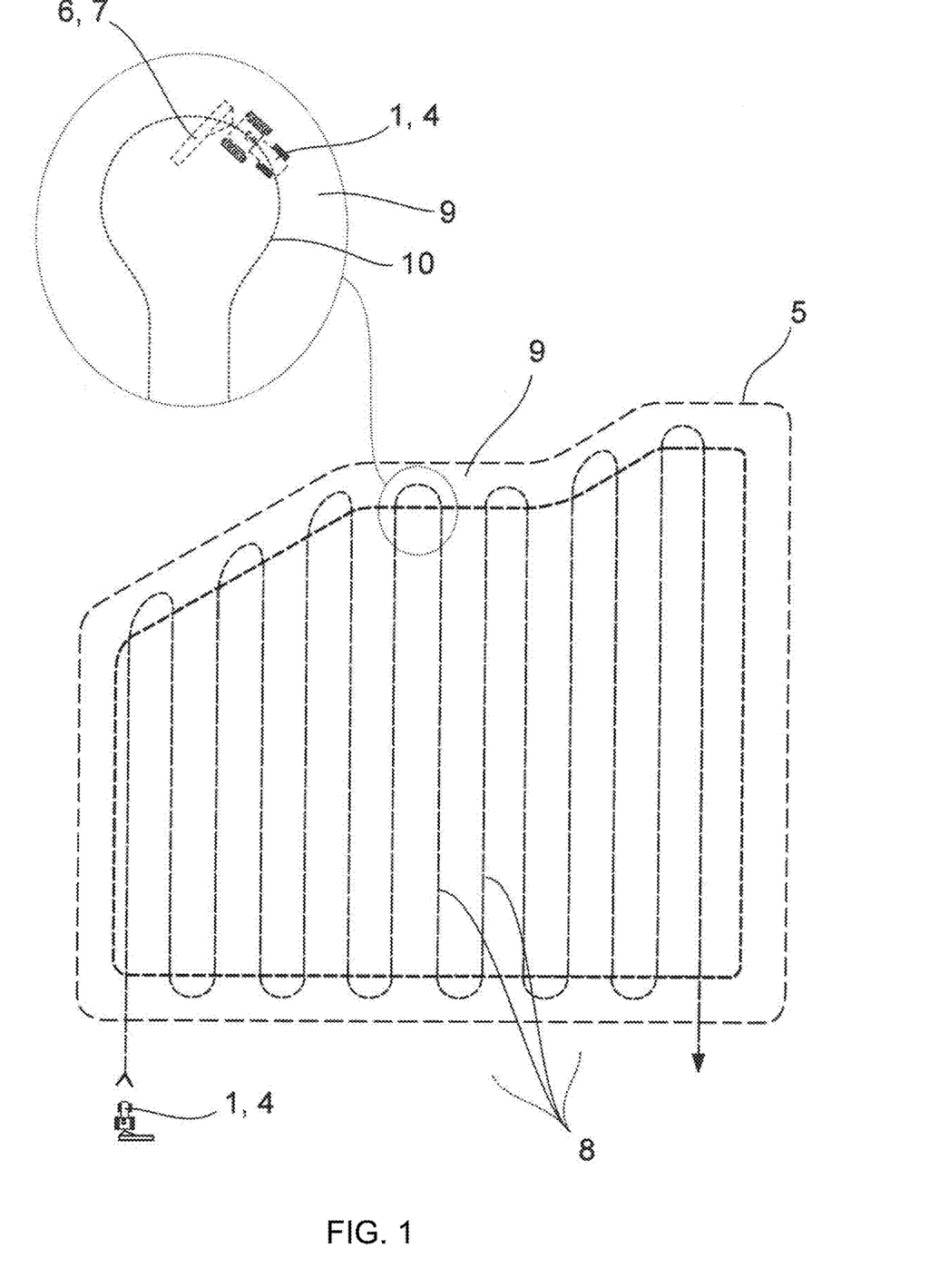
FIG. 1 illustrates a schematic view from above of a proposed agricultural machine while carrying out an agricultural working task.

Referring to the figures, FIG. 1 illustrates how an agricultural machine 1, here such as a tractor 4, harvests a field 5. Various crops are contemplated for harvesting. For example, the crop to be harvested may be grass, for which reason the tractor 4 has a mower bar 7 as the attached working unit 6. The field 5 is shown with corresponding parallel travel tracks 8 which the agricultural machine 1 follows. In the region of the headland 9, the travel tracks 8 are illustrated, and may be connected via a Ω-shaped travel track 10. The travel tracks are merely for illustration purposes. Other travel tracks are contemplated. When travelling through the headland 9 along the Ω-shaped travel track 10, the agricultural machine 1 carries out a number of automatically performed steps or commands which allow an automatic change in the direction of travel of the agricultural machine 1. These steps/commands are controlled by a sequence management system, which for each change in direction of travel carries out the same sequence of stored operating steps/commands in order to relieve the operator of the burden of inputting the operating steps/commands.

Figure 2:
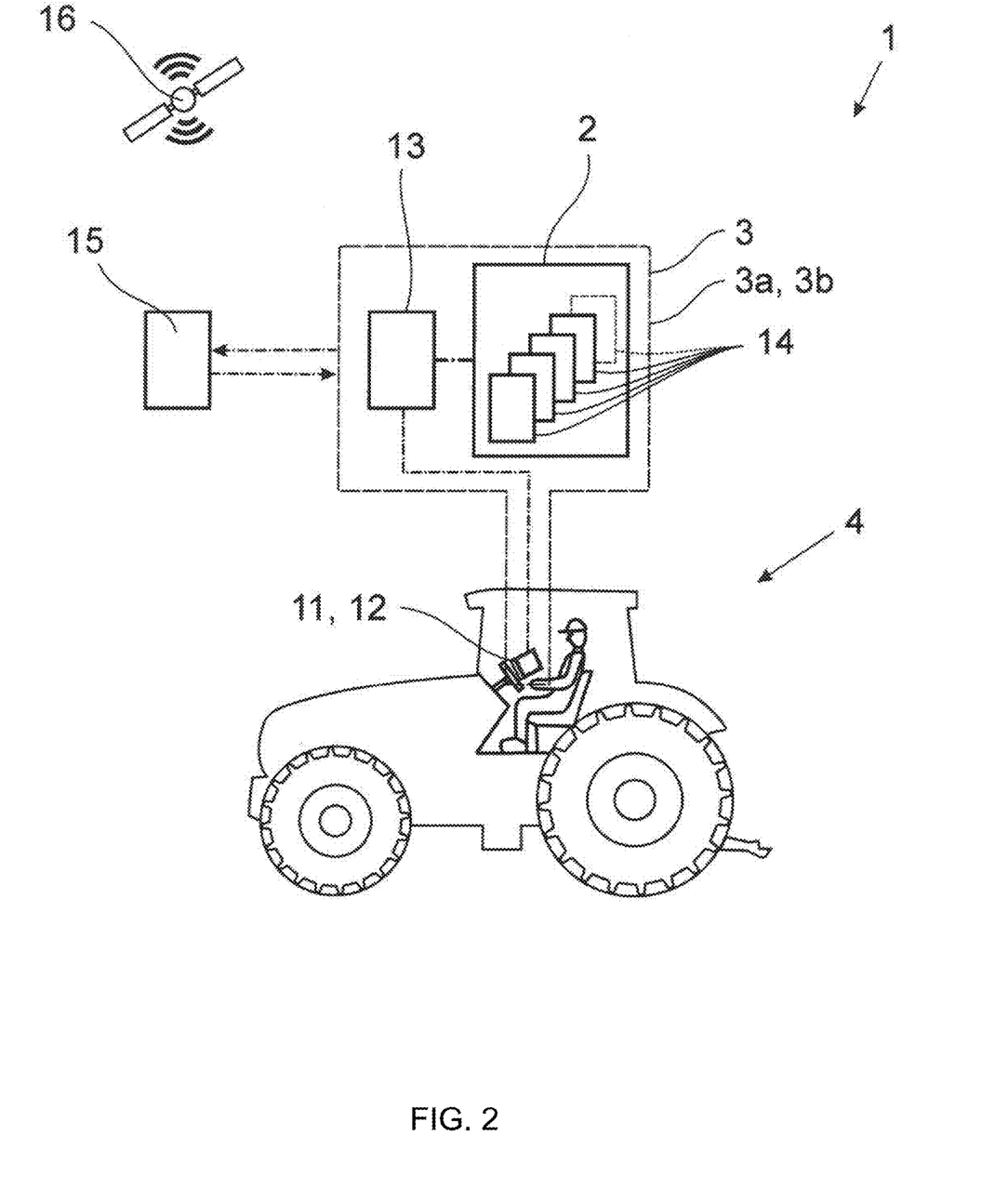
FIG. 2 illustrates a schematic side view of a proposed agricultural machine during the setting up of a driver assistance system.

The configuration of driver assistance system 3, with one or more corresponding systems (e.g., any one, any combination or all of: a corresponding satellite-based steering system 3a; a sequence management system 3b; a section control system; a system for controlling and/or regulating an electronic drawbar; a system for autonomous working; and/or distance monitoring system) is carried out by means of the set-up assistant unit 2, which is schematically shown in FIG. 2.

The set-up assistant unit 2 may be activated or called up by the operator via input/output unit 11, which may form part of the driver assistance system 3. The input/output unit 11 comprises virtual operating elements (not illustrated), which may be displayed on a touchscreen 12. Various types of virtual operating elements are contemplated. For example, set-up assistant unit may output one or more virtual buttons on input/output unit 11. After which, upon the operator touching a respective virtual button, the input/output unit 11 may indicate the virtual activation of the respective virtual button. In one implementation, touchscreen 12 may also enable the set-up assistant unit 2 to display the selection of the working task (as indicated by the operator) and/or the working task-specific setting in a symbol, image and/or text-based manner and allows selection and confirmation by the operator through pressing on the corresponding symbols, images or text fields. Through this, the operator may carry out settings relating to an agricultural working task (e.g., the selection of the working task-specific setting(s)) and information about the settings to be made or that have been made can be displayed.

As discussed above, in one implementation, the set-up assistant unit 2 may be part of the driver assistance system 3. In an alternate implementation, the set-up assistant unit 2 may be separate from the driver assistance system 3. Further, in one implementation, the processing functionality (such as one or more microprocessors) may be shared between the set-up assistant unit 2 and the driver assistance system 3. Alternatively, the processing functionality for the set-up assistant unit 2 may be separate from the driver assistance system (e.g., separate microprocessors). In this regard, one or both of the driver assistance system 3 or the input/output unit 11 may also comprise a computational functionality 13, which results in the working task-specific configuration of the set-up assistant unit 2 and/or the configuration of the driver assistance system 3.

Computational functionality 13 may include a processor 49 and a storage medium 50. FIG. 2 illustrates one type of computer functionality. Processor 49 may comprise a type of controller, such as processor, a microcontroller, an Application Specific Integrated Circuit (ASIC), Programmable Logic Device (PLD), or Field Programmable Gate Array (FPGA), or the like. Storage medium 50 may comprise one or more types of storage medium, such as volatile memory and/or non-volatile memory. Further, processor 49 and storage medium 50 may be separate devices, communicating via an external bus. Alternatively, processor 49 and storage medium 50 may be within the same device, communicating via an internal bus. Logic, such the functionality described here, may be implemented in software stored in storage medium 50 and/or stored within processor 49, as discussed further below.

In one implementation, a memory, such as storage medium 50, in the agricultural machine 1 may correlate agricultural working tasks with storage packages 14. In practice, responsive to the operator predetermining or deciding on a specific agricultural working task, which may be shown by the set-up assistant unit 2 for example, the microprocessor may access the memory in order to select, from a group of storage packages 14, the storage package 14 correlated to the specific agricultural working task selected by the operator. Based on this predetermined selected agricultural working task, the set-up assistant unit 2 may perform a basic configuration of one or more systems of the agricultural machine 1, such as the driver assistance system 3, the steering system 3a, the sequence management system 3b, etc. The set-up assistant unit 2 also allows the operator to load a travel route and/or sequence of operating steps/commands, such as a headland sequence corresponding to the agricultural working task from an external data source 15. In practice, with the disclosed driver assistance system 3, the agricultural machine 1 may also record and/or edit a working task-specific travel route and/or sequence of operating steps/commands. The recorded and/or edited data can then be stored in the driver assistance system 3 of the agricultural machine 1 and/or on the external data source 15 in order to be able to access it for a subsequent agricultural working task to be performed.

The agricultural working task for the driver assistance system 3 and the set-up assistant unit 2 may comprise a predetermined agricultural working task, such as, for example, an agricultural working task selected from the group including any one, any combination, or all of: "ground/soil working"; "sowing"; "planting"; "plant protection"; "fertilising"; "manure and dung"; and "stubble breakage". These agricultural working tasks may be subordinate to the work type "cultivation". The agricultural working task may also be selected from the group including any one, any combination, or all of: "grassland management"; "harvesting"; "grassland care"; and "silage". These working tasks may be subordinate to the work type "fodder harvesting". Finally, the agricultural working task may be selected from the group comprising any one, any combination, or all of: "material handling"; "forestry work"; "transport"; and "communal work". These working tasks may be subordinate to the work type "other work". In one implementation, the term "agricultural working task" includes all the aforementioned working tasks and should be understood in an accordingly broad manner. In the example of embodiment shown in FIG. 1, fodder harvesting is being carried out as the superordinate working task, wherein the specific working task here is harvesting. As the appropriately assigned working unit 6 for performing the agricultural working task, a mowing bar 7 is used here.

Based on the working task specific basic configuration, the set-up assistant unit 2 can produce at least one entry screen which is shown by the input/output unit 11. Via the entry screen(s) (not shown here), the operator can perform the working task-specific settings subordinate to the basic configuration of the driver assistance system 3 for computer-supported planning of a travel route and/or a headland sequence and/or can confirm such a setting which has been determined by the system. As one example, the set-up assistant unit 2 may output a series of options, with the operator selecting from the series of options in order to configure the working task-specific settings. As another example, the set-up assistant unit 2 may generate recommended working task-specific settings, with the operator confirming or approving the recommended working task-specific settings generated by the set-up assistant unit 2. In one implementation, it is envisaged that the working task-specific setting is subordinate to the basic configuration. In this regard, various working task-specific settings may be selected and/or displayed by the input/output unit 11. Example working task-specific settings include any one, any combination, or all of: a correction signal setting; the selection and/or configuration of a working unit 6 for performing or supporting the agricultural working task; the selection and/or configuration of a speed sensor; the selection and/or configuration of a georeference system 16; the selection and/or configuration of a travel route; and/or the selection and/or configuration of a headland sequences.

Figure 3:
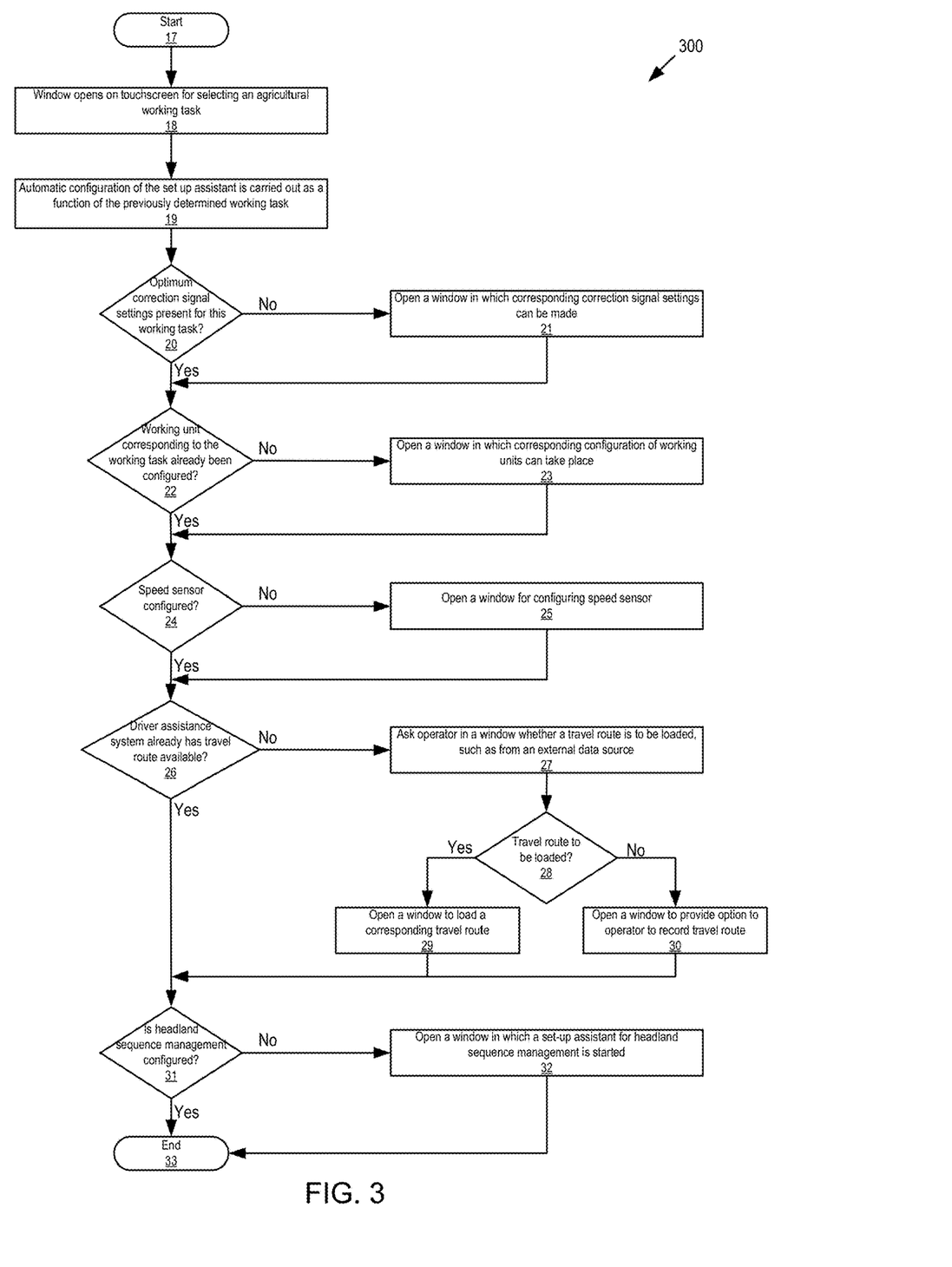
FIG. 3 illustrates a schematic view of the basic sequence of interactive setting up of the driver assistance system of the agricultural machine in FIG. 1 or FIG. 2.

FIG. 3 schematically shows as a flow diagram 300 the sequence of interactive setting up of the driver assistance system 3 of the agricultural machine 1 in FIG. 1 or FIG. 2. At 17, the setting up routine of the set-up assistant unit 2 starts. At 18, on the touchscreen 12, a window opens for selecting an agricultural working task. Responsive to the window, the operator may select the agricultural working task. As discussed above, the window may generate a plurality of available agricultural working tasks for the operator to choose from. Alternatively, the window may include a field in which the operator may input the desired agricultural working task. At 19, automatic configuration of the set-up assistant unit 2 is then carried out as a function of the previously determined working task. At 20, it is then determined whether optimum correction signal settings are present for this working task. If not, at 21, a window opens in which corresponding correction signal settings can be made. As one example, the operator may be presented with a plurality of potential correction signal settings from which to choose, and may select one or more of the plurality of potential correction signal settings. As another example, the operator may enter one or more correction signal settings without set-up assistant unit 2 providing any suggestions. As still another example, set-up assistant unit 2 may generate one or more suggested correction signal settings, with the operator requested to give confirmation of the one or more suggested correction signal settings for use. At 22, in a following step, it is determined whether a working unit 6 corresponding to the working task has already been configured. If not, at 23, a window opens in which corresponding configuration of working units 6 can take place. Again, the set-up assistant unit 2 may provide options for configuring the working unit 6, from which the operator may choose. Alternatively, the operator may input options for configuring the working unit 6 without set-up assistant unit 2 providing suggestions. Or, set-up assistant unit 2 may generate a suggested configuration of the working unit 6, with the operator requested to give confirmation of the suggested configuration of the working unit 6 for use. In a following step, at 24, it is determined, for example, whether a speed sensor is configured. If not, at 25, a window opens for configuring a speed sensor. Similarly, the configuration of the speed sensor may be based on the set-up assistant unit 2 generating options for configuring speed sensor on input/output unit 11 for operator to choose from, based on operator configuring speed sensor unaided by set-up assistant unit 2, or based on the operator agreeing to the recommended configuration of the speed sensor by the set-up assistant unit 2. In following step, at 26, it is then determined whether the driver assistance system 3 already has a travel route available. If not, at 27, the operator is asked in a window whether a travel route is to be loaded, for example from an external data source (for example, from a USB stick, computer centre, etc.). At 28, a corresponding determination then follows if a travel route is to be loaded. If so, at 29, a window is opened on the input/output unit 11 in order to load a corresponding travel route. Otherwise, at 30, a window opens with which the operator has the option of recording a travel route. In a following step at 31, it is determined, for example, whether headland sequence management is configured. If not, at 32, a window opens in which a set-up assistant unit for headland sequence management is started. At 33, flow diagram 300 ends.

Figure 4:
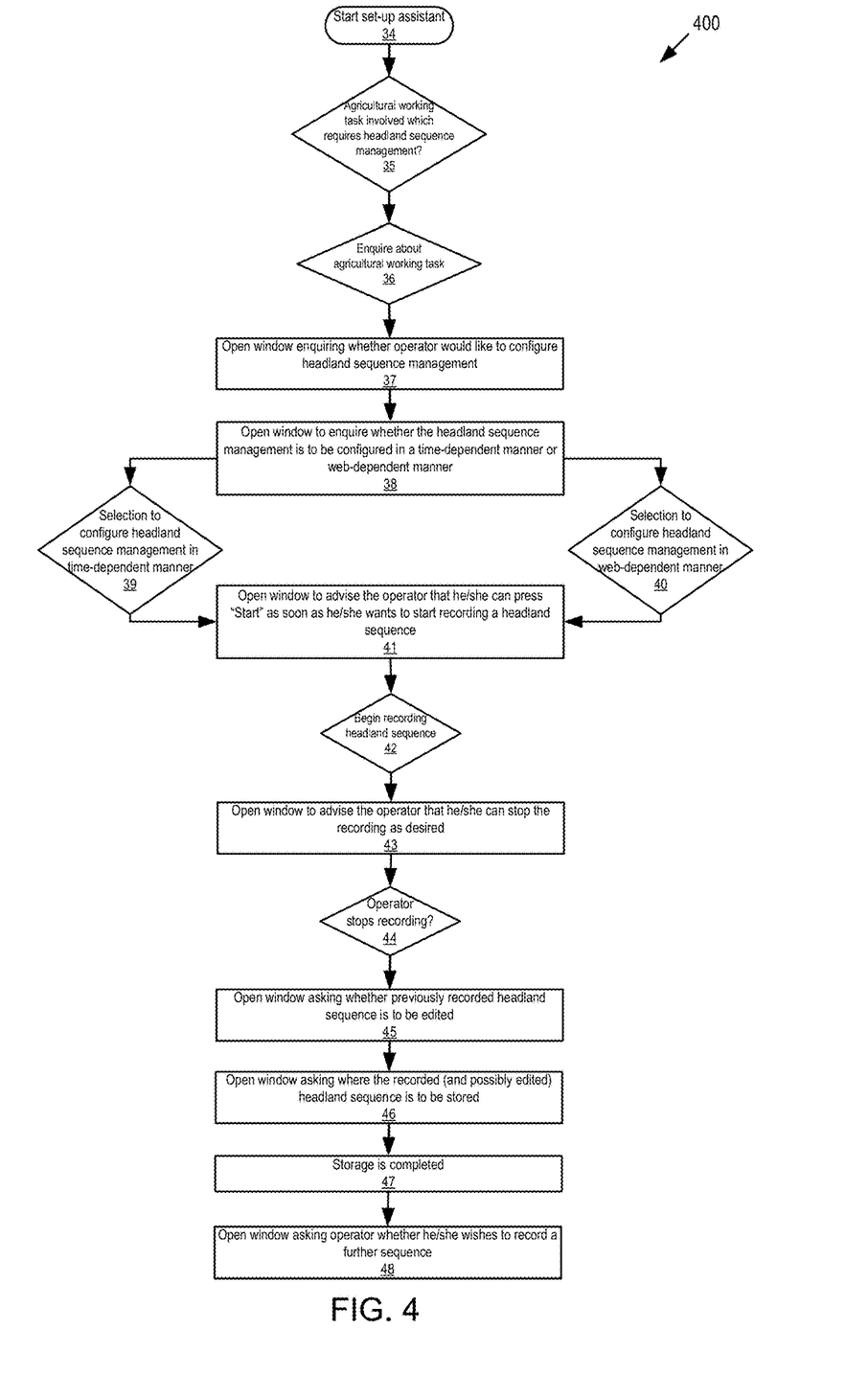
FIG. 4 illustrates a schematic view of the basic sequence of interactive setting up of headland management system as part of the driver assistance system of the agricultural machine in FIG. 1 or FIG. 2.

The setting up of such headland sequence management is explained, for example, by way of the flow diagram 400 in FIG. 4. At 34, the set-up assistant unit is started. After which, at 35, it is initially determined whether an agricultural working task is involved which requires headland sequence management. At 36, the agricultural working task is then inquired about. At 37, a window then opens in which it is inquired whether the operator would like to configure the headland sequence management. At 38, a window then opens in which it is inquired whether the headland sequence management is to be configured in a time-dependent or web-dependent manner. The operator can then make a corresponding selection at 39 or at 40. At 41, a window opens in which the operator is advised that he/she can press "Start" as soon as he/she wants to start recording a headland sequence. After confirmation by the operator, at 42, recording of the headland sequence begins. At 43, a window then appears advising the operator that he/she can stop the recording as soon as he/she wishes. At 44, operation then stops the recording of the headland sequence accordingly. At 45, a window then asks whether the previously recorded headland sequence is to be edited. At 46, in a following window, it is then inquired where, and in particular on which function key, the recorded and possibly edited headland sequence is to be stored. The latter inquiry can alternatively occur even before the start of the recording, e.g., a window at 46 may be shown before window at 41. At 47, the storage is completed. After which, at 48, the operator is asked in a then opening window whether he/she wishes to record a further sequence.

LIST OF REFERENCES

1 Agricultural Machine
2 Set-up assistant unit
3 Driver assistance system
4 Tractor
5 Field
6 Working unit
7 Mowing bar
8 Parallel travel tracks
9 Headland
10 Ω-shaped travel track
11 Input/output unit
12 Touchscreen
13 Computational functionality
14 Storage packages
15 External data source
16 GPS or georeference system
17-33 Flow diagram elements set-up driver assistance system
34-48 Flow diagram elements set-up sequence management
49 Processor
50 Storage medium Each of the items listed above may be associated with a single electronic device or may be combined within a single electronic device. Further, with regard to each separate electronic device, processing/memory functionality may be included. For example, any one, any combination, or all of the following may be in a single electronic device with associated with processing/memory functionality: the set-up assistant unit; driver assistance system; working unit; input/output unit; touchscreen; computational functionality; storage packages; and GPS or georeference system.

The methods, devices, processing, circuitry, and logic described above may be implemented in many different ways and in many different combinations of hardware and software. As discussed above, a processor 49 and a storage medium 50 may be used. The processor 49 and the storage medium 50 are merely one example of a computational configuration. Other types of computational configurations are contemplated. For example, all or parts of the implementations may be circuitry that includes a type of controller, including as an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. An agricultural machine comprising:
   a driver assistance system comprising a steering system, a sequence management system, a section control system, a system for controlling an electronic drawbar, a system for autonomous working and a distance monitoring system; and
   an input/output unit, the input/output unit comprising a set-up assistant unit that comprises at least one processor, and configured to:
   display virtual operating elements;
   receive, from a plurality of available agricultural working tasks, an indication of a selected agricultural working task from an operator;
   after receiving the indication of the selected agricultural working task and responsive to determining that settings for the selected agricultural working task have not been set, open a first window in order to set the settings for the selected agricultural working task;
   after setting the selected agricultural working task via the first window to set the settings and responsive to determining that a working unit corresponding to the selected agricultural working task has not been configured, open a second window in order to configure the working unit;
   after configuring the working unit via the second window to configure the working unit and responsive to determining that a speed sensor has not been configured, open a third window in order to configure the speed sensor;
   after configuring the speed sensor via the third window to configure the speed sensor and responsive to determining that a travel route has not been determined, open a fourth window to determine the travel route;
   enable input by the operator of settings associated with the virtual operating elements to set up the driver assistance system; and
   display information corresponding to the settings;
   wherein the set-up assistant unit is configured, depending on the indication of the selected agricultural working task from the operator, to set up at least one of the steering system, the sequence management system, the section control system, the system for controlling the electronic drawbar, the system for autonomous working or the distance monitoring system.

2. The agricultural machine of claim 1, wherein the agricultural machine comprises a tractor.

3. The agricultural machine of claim 1, wherein the set-up assistant unit is configured, depending on the indication of the selected agricultural working task from the operator, to set up the steering system, the sequence management system, the section control system, the system for controlling the electronic drawbar, the system for autonomous working and the distance monitoring system based on the selected agricultural working task from the operator.

4. The agricultural machine of claim 1, wherein the set-up assistant unit is configured to:
   output the plurality of available agricultural working tasks;
   responsive to outputting the plurality of available agricultural working tasks, receive the indication of the selected agricultural working task from the operator; and
   responsive to receiving the selected agricultural working task, configure set-up of the steering system of the agricultural machine.

5. The agricultural machine of claim 1, wherein the set-up assistant unit includes screens available for setting up corresponding to each of the plurality of available agricultural working tasks; and
   wherein, responsive to the indication of the selected agricultural working task from the operator, the set-up assistant unit is configured to select a series of input screens, the series of input screens for configuration of the selected agricultural working task by the operator and being less than all of the screens available for setting up corresponding to each of the plurality of available agricultural working tasks.

6. The agricultural machine of claim 5, wherein at least one of the series of input screens is prepopulated with set-up information based on the selected agricultural working task from the operator; and
   wherein the operator is requested to confirm set up based on the set-up information.

7. The agricultural machine of claim 6, wherein the set-up assistant unit includes a plurality of storage packages, each of the plurality of storage packages comprising at least one input screen; and
   wherein the set-up assistant unit is configured to select one of the plurality of storage packages in order to generate the series of input screens.

8. The agricultural machine of claim 1, wherein the selected agricultural working task comprises at least one of ground/soil working; sowing; planting; plant protection; fertilizing; manured and dung; harvesting; and stubble breakage.

9. The agricultural machine of claim 1, wherein the selected agricultural working task comprises grassland management; harvesting; grassland care; and silage.

10. The agricultural machine of claim 1, wherein the set-up assistant unit is configured to generate at least one input screen for display by the input/output unit;
wherein the at least one input screen is:
indicative to the operator to select a working task-specific setting subordinate to a basic configuration for a computer-supported planning of the travel route and a sequence of operating steps from a group of settings; and
a confirmation of at least one working task specific setting subordinate to the basic configuration and specified by the set-up assistant unit for the computer-supported planning of the travel route and the sequence of operating steps.

11. The agricultural machine of claim 10, wherein the working task-specific setting subordinate to the basic configuration comprises at least one of a setting of a correction signal setting, a speed sensor, a georeference system, the travel route or a headland sequence.

12. The agricultural machine of claim 11, wherein the set-up assistant unit is configured to illustrate a plurality of selection options for the working task-specific setting subordinate to the basic configuration.

13. The agricultural machine of claim 12, wherein the selected agricultural working task comprises ground/soil working; sowing; planting; plant protection; fertilizing; manured and dung; harvesting; and stubble breakage.

14. The agricultural machine of claim 12, wherein the selected agricultural working task comprises grassland management; harvesting; grassland care; and silage.

15. The agricultural machine of claim 12, wherein the selected agricultural working task comprises material handling; forestry work; transport; and communal work.

16. The agricultural machine of claim 12, wherein the set-up assistant unit is configured to allow the operator to load the travel route and sequence of operating steps from an external data source and to record the travel route and the sequence of operating steps.

17. The agricultural machine of claim 16, wherein the sequence of operating steps is a headland sequence.

18. The agricultural machine of claim 16, wherein the set-up assistant unit includes screens available for setting up corresponding to each of the plurality of available agricultural working tasks;
wherein, responsive to the indication of the selected agricultural working task from the operator, the set-up assistant unit is configured to select a series of input screens, the series of input screens for configuration of the selected agricultural working task by the operator and being less than all of the screens available for setting up corresponding to each of the plurality of available agricultural working tasks;
wherein at least one of the series of input screens is prepopulated with set-up information based on the selected agricultural working task from the operator;
wherein the input/output unit comprises a touchscreen; and wherein the set-up assistant unit is configured to show the selected agricultural working task and a working task-related setting in a symbol-based manner or an image-based manner.

19. The agricultural machine of claim 1, wherein the set-up assistant unit is further configured to, after loading the travel route and responsive to determining that a headland sequence management has not been configured, open a fifth window for the headland sequence management.

20. The agricultural machine of claim 1, wherein the set-up assistant unit is configured to open a window to determine the travel route by:
determining whether the travel route is to be loaded; and
responsive to determining that the travel route is to be loaded, opening a sixth window to load the travel route.

* * * * *